July 30, 1929.  J. W. SPENSLEY  1,722,687
PROCESS FOR PRODUCING INTIMATE MIXTURES OF SUBSTANCES
AND FOR OBTAINING CHEMICAL PRODUCTS THEREFROM
Filed March 5, 1923  4 Sheets-Sheet 1

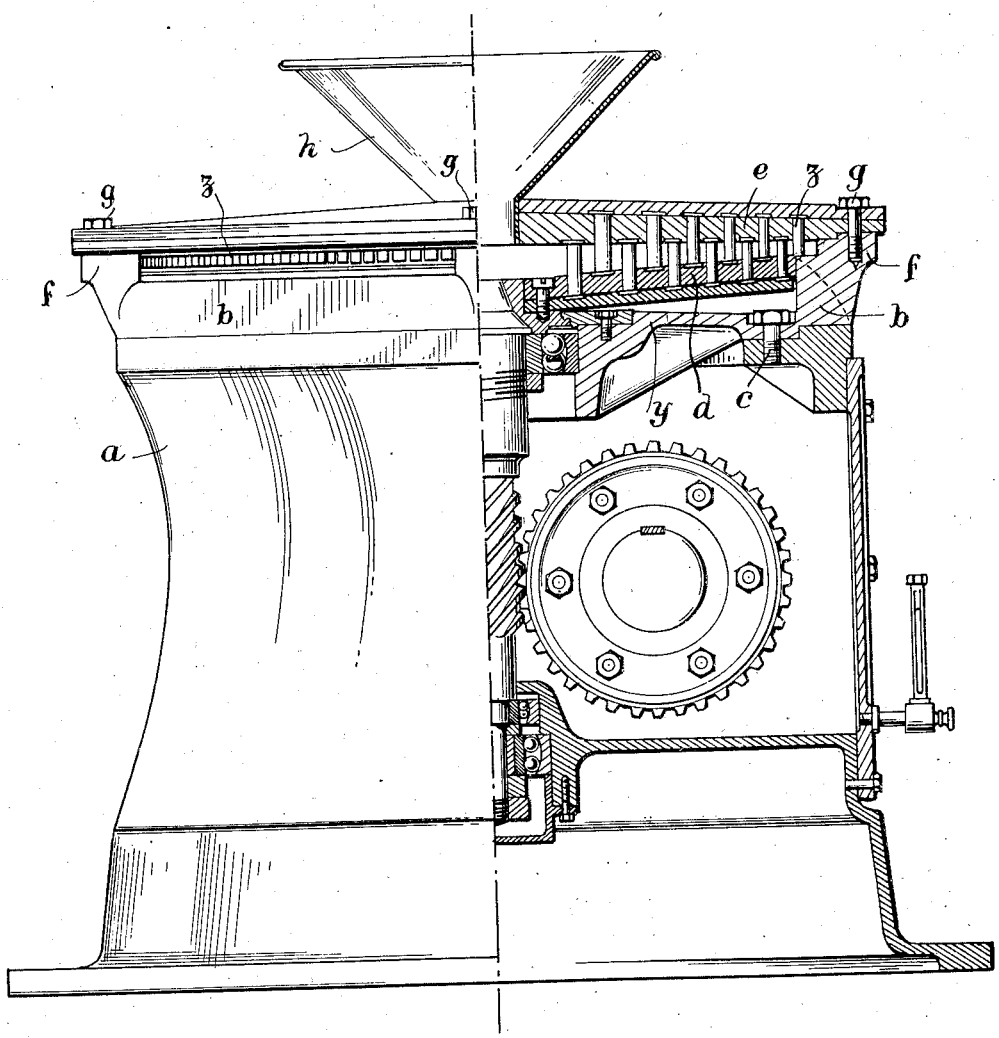

Patented July 30, 1929.

1,722,687

UNITED STATES PATENT OFFICE.

JACOB WILLIAM SPENSLEY, OF MANCHESTER, ENGLAND.

PROCESS FOR PRODUCING INTIMATE MIXTURES OF SUBSTANCES, AND FOR OBTAINING CHEMICAL PRODUCTS THEREFROM.

Application filed March 5, 1923, Serial No. 623,067, and in Great Britain April 4, 1922.

This invention relates to processes for producing intimate mixtures of substances with the object of forming chemical compounds or mixtures containing products of reaction. The invention depends upon the treatment of materials in a high-speed centrifugal type of mill with intercalating pins mounted upon discs. Various types of intercalating pinned disc mills are known which operate with a beater action upon materials fed in at the centre of the discs, and thrown outwardly by centrifugal action. The preferred type of mill for the purposes of the present invention is that set forth in the specification of my British Patent No. 186,462 wherein the discharge from the rotating pinned disc can take place all round the circumference. The mills of the type referred to, having discs with intercalating pins, can be run up to speeds of about 20,000 feet per minute and with a minimum peripheral speed of 10,000 feet per minute at the outermost row of pins or the circumference of the disc carrying the same.

I have now discovered that when liquid mixtures, or solids and semi-solids whether mixed or not with liquids, are passed through such mills, it is possible to effect such intimate mixtures of the ingredients that reactions between them are caused to take place practically instantaneously, which reactions could otherwise only be made to take place in general by the use of long continued heating or long continued agitation, or both. By the use of the high speed centrifugally fed pinned disc mill in the processes according to this invention the speed at which the reactions are caused to take place is greatly increased and the results are substantially improved as compared with results obtainable by other processes hitherto in use. Gases may also enter into the reactions in the mill. When required for any purpose, the mill in which the reactions according to this invention are caused to take place may be heated for example by steam coils or a heating jacket.

In the accompanying drawings:—

Figure 4 is an elevation half in section of the mill, apart from its casing.

Figure 1:
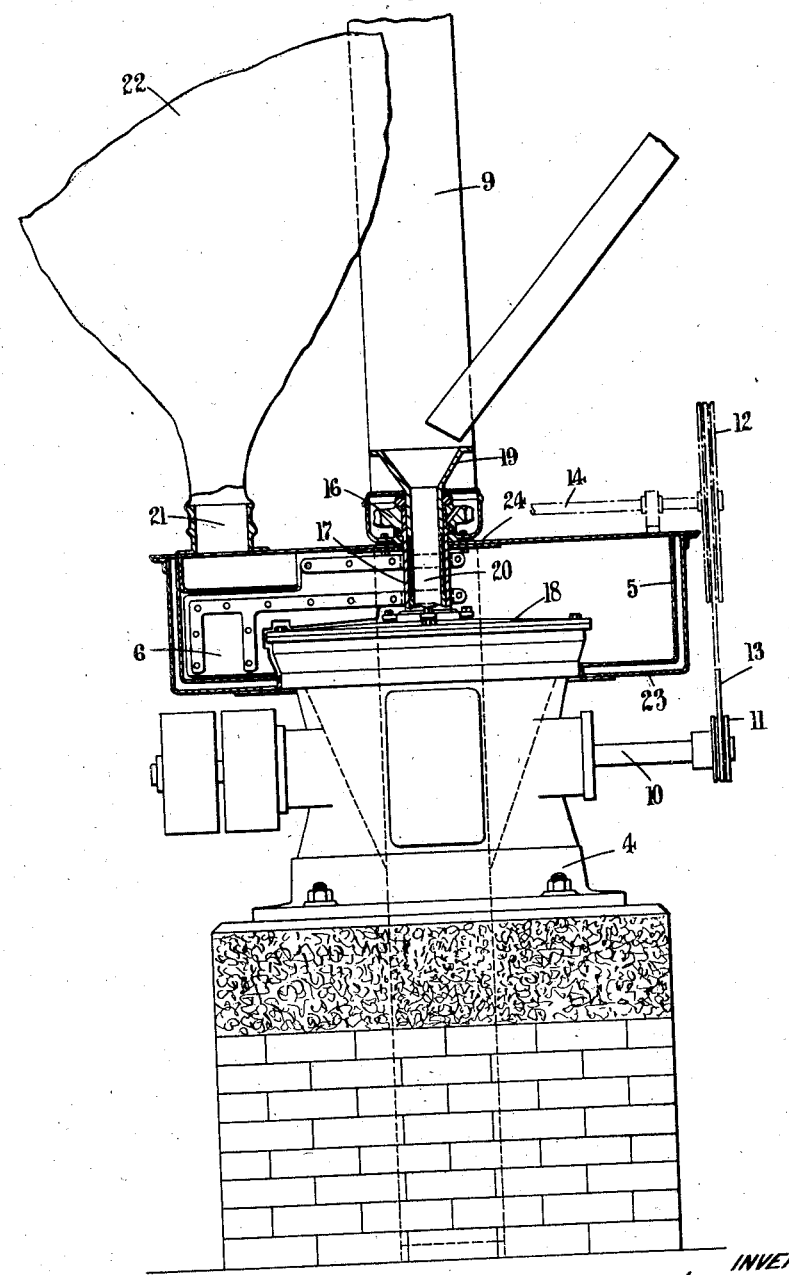
Figure 1 is a front view, partly in section, on the line 1—1 of Figure 3.
Figure 3:
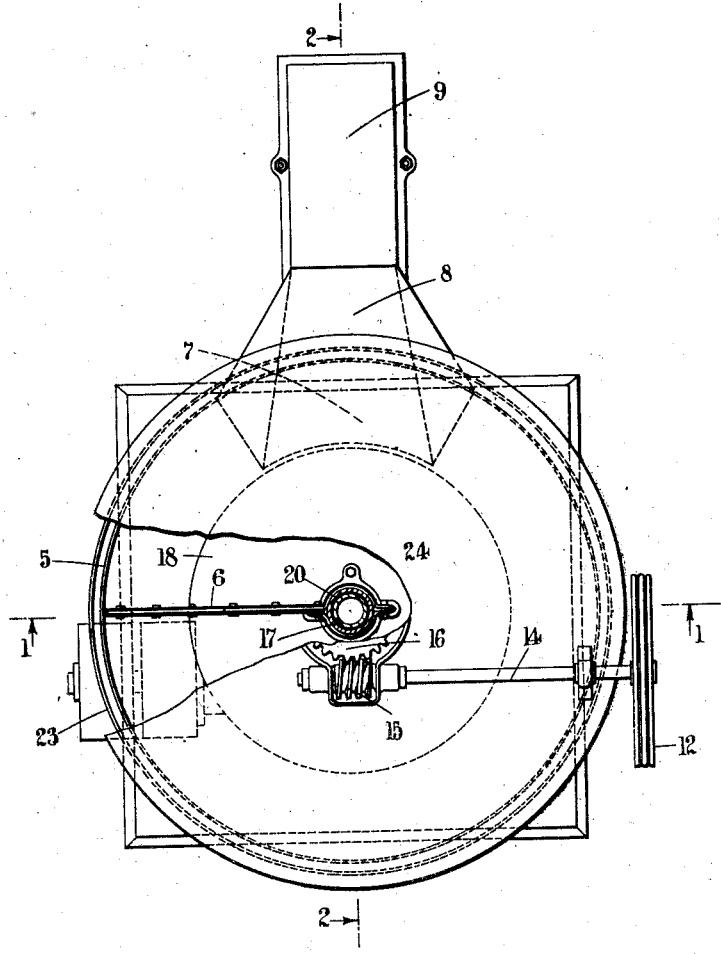
Figure 3 is a plan view, partly broken away, of a form of pinned disc mill and its accessories suitable for the practice of my invention.

In these drawings, Figures 1 and 3 show a form of casing and accessories for use with the open delivery pinned disc mill, when the product as discharged is in a pasty or other condition in which it is liable to cling to the walls of casings, such as shown in Figs. 3 to 5 of my prior patent No. 1,515,798, dated November 18, 1924.

Referring to Figure 4, $a$ represents the shell or standard of the mill in which the driving gearing is contained. At the top of this shell is a plate $y$ secured by screws $c$ and whose circumference constitutes the delivery ring $b$. The rotating disc $d$ of the mill is secured to the driven vertical shaft which is carried in ball bearings in a suitable manner in the plate $y$, as indicated by way of example. The stationary top disc $e$ is suppported by a number of lugs $f$, four in the example shown, on the delivery ring $b$, and is secured by screws $g$ engaging in these lugs. The bottom disc $d$, which rotates has concentric rows of upwardly projecting pins upon it, while the top disc $e$ which is stationary has similar concentric rows intercalating with those on the disc $d$. Hitherto, in pinned disc mills, the lower disc which rotates, has always carried the outermost row of pins, this being essential in the case of mills with a tangential discharge in order to insure the throwing out of the ground materials through such discharge. A feature of my disintegrating mill is that it enables me to apply an additional annular row of pins $z$ to the upper fixed disc $e$, outside the last row of pins on the lower disc $d$, and so to improve the efficiency of the mill. I find that with the addition of this row of pins $z$, the material is ground to a greater degree of fineness in one passage through the mill, without the consumption of appreciably more power, and without any risk of choking the mill owing to the open circumferential discharge. The current of air which the rotation of the lower disc induces through the mill is quite sufficient to insure that the material is blown cleanly through the additional outermost row of stationary pins. $h$ is a feed hopper at the centre of the top disc for delivering the materials to be treated on to the surface of the rotating disc $d$.

Figure 2:
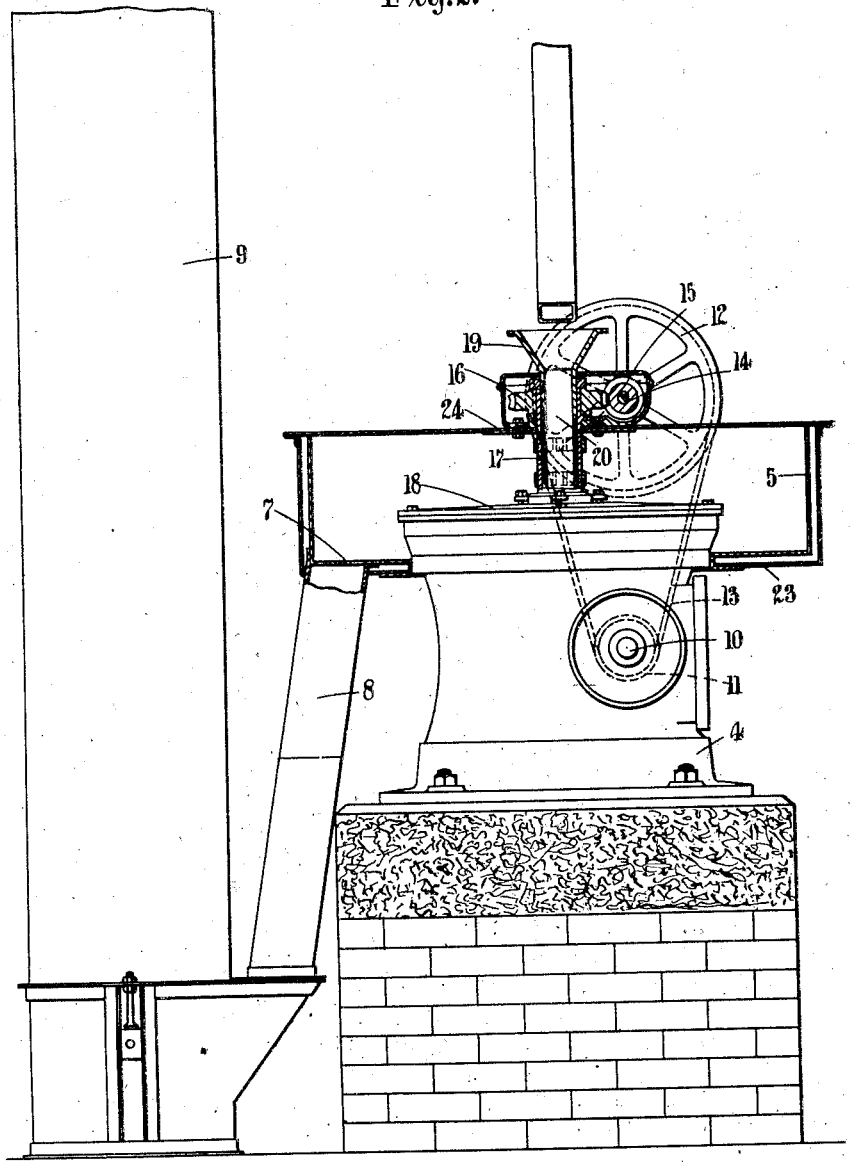
Figure 2 is a side view, partly in section, on the line 2—2 of Figure 3.

The mill itself carried by the standard 4, may be identical with the mill shown in Figures 1 and 2 of the drawings of British Patent Specification No. 186,462. Its discharge outlet is surrounded by an annular casing or bin 5 which receives the discharged products, and a scraper 6 is caused to move round inside the casing 5, so as to discharge the products through the opening 7 of a chute 8; this chute leads to the bottom of an elevator 9 for taking away the products to any required point of delivery in a factory. The scraper 6 is driven from the power shaft 10 through belt pulleys 11 and 12, and belt 13, the pulley 12 being on a shaft 14 which carries a worm 15. This worm drives worm wheel 16 secured to a sleeve 17 which is revolubly supported in the top 24 of the bin 5 and upon the cover 18 of the mill, and carries the scraper 6. The feed hopper 19 for the mill communicates with the interior of this latter through a tubular inlet 20 passing down through the interior of the revoluble sleeve 17, and into the central aperture of the cover 18. The top of the casing 5 has an opening therein leading through a trunk 21 to a dust collecting balloon 22. The casing 5 is shown as having a steam jacket 23 for use when the products are required to be kept hot during the treatment and on discharge.

The following examples will indicate sufficiently the classes of reactions for which the treatment of the reagents in the mill is suitable.

1. *Common soap manufacture.*—A method commonly adopted for making common (hard) soap is to boil in a pan the fatty acids (obtained from fats by splitting them with sulphonated oil to separate the glycerine), and to add the alkali such as caustic soda, continuing the boiling for about two days, after which the saponified product can be run into frames to solidify. According to the present invention, the ingredients for making the common soap are brought into intimate contact in the mill, and after being passed through the mill any required number of times the product is a soap which requires no boiling or other such treatment in order to complete its manufacture.

As a practical example of the ingredients which may be used in making a soap the following may be given: 4 parts by weight of coconut oil and 6 parts by weight of stearine are melted together in a suitable pan at a temperature of about 82° C. 1.5 parts by weight of solid sodium hydrate are dissolved in 11 parts by weight of water, and the solution of sodium hydrate is run into the mill at a uniform speed simultaneously with the hot mixture of coconut oil and stearine, the speed of running in being such that the proportions of the ingredients are in the ratio as above referred to. After passing through the mill once, the product is fed into the same or another mill, and after the second passage through the mill the product will be found to be still warm. It can be run straight into frames for crutching in order to expel air bubbles if required, and for setting into a solid soap. With the mixture of ingredients above referred to the soap contains 45% of saponified fatty acid. Any other ingredients may be mixed with the soap by feeding them into the mill simultaneously with the fatty acid and the alkali. When the soap has set no free fat remains therein, the intimate contact between the particles which is effected by the passage through the mill being sufficient to insure the completion of the reaction. A single high speed mill of the type set forth having a rotating disc about 26″ in diameter provided with 87 pins, each one inch in diameter and operated at 27,000 revolutions per minute, thus producing a peripheral speed of 18,368 feet per minute will complete the saponification of one ton of the mixture per hour, allowing for two passages of the mixture through the mill.

2. *Soft soap manufacture.*—The method only differs from that set forth above in regard to the ingredients used. These ingredients are generally vegetable or animal oil and caustic potash.

As an example of a suitable mixture the following may be given: 8 parts by weight of olein containing 95% of free fatty acid, and 2 parts by weight of cotton seed oil are heated in a pan to a temperature of about 82° C., and a solution of caustic potash is made up to a density of 38° Twaddell. 11.5 parts by weight of this solution are run into the mill at a uniform rate, while 10 parts by weight of the fatty acid are being run in, and saponification is complete after a single passage through the mill. More water may be used if desired, depending upon the quality of the soap to be made.

3. *Manufacture of dry soap powder.*—A method commonly adopted hitherto for making dry soap is to mix soda ash with a considerable percentage of water and after the product has set it is ground up to form a fine powder. With this is mixed in mechanical mixing apparatus a certain percentage of disintegrated common soap made by usual methods. The mixture forms a dry soap powder. According to the present invention the ingredients for making the soap itself, and also the soda ash or its equivalent, or even caustic soda, and the necessary amount of water are introduced simultaneously into the high speed centrifugal pinned disc mill, and are caused to combine during one or more passages through the mill with the formation of a finely disintegrated dry soap powder. A fatty acid is taken in quantity sufficient in relation to the other ingredients to form a dry soap having the required soap content; an amount of soda ash or its equivalent is also taken sufficient, on the one hand, to combine with the fatty acid and to saponify it completely, and, on the other hand, to introduce into the dry soap powder the requisite amount of uncombined soda ash to give the soap powder its detergent action. In the passage of the mixture through the mill the high speed beating action combined with the centrifugal action throwing the materials against and through the spaces between the pins insures that the fatty acid is completely combined with soda to form soap and that the soap so formed is intimately mixed with the rest of the soda ash, the mixture taking up the amount of water with which it will combine so that the product issues as a substantially dry powder.

As a practical example of the manufacture of the dry soap the following may be given: 6 parts by weight of palm kernel fatty acid are stirred up with 7 parts by weight of water at a temperature of about 50° C. and the mixture is poured in to the inlet hopper of the mill, while dry soda ash is fed in mechanically at such a rate that about 21 parts by weight of soda ash are introduced while 6 parts by weight of fatty acid and 7 parts by weight of water are being fed in. The product as it leaves the mill is a fine powder which is non-hygroscopic and will therefore remain in packages as a dry soap powder. The reaction between the fatty acid and the soda ash may not be complete when the product leaves the mill, but at least a superficial layer of soap will be formed around each particle of soda ash which has any uncombined fatty acid in contact with it so that no caking together will occur if the saponifying reaction continues after product leaves the mill.

4. *Manufacture of edible oils* (removal of free fatty acid from oils).—In producing edible oils it is necessary to saponify the fatty acids contained in the oils, and the usual method of doing this at present is to treat the oils with caustic soda. The result, however, is not only to saponify the fatty acids, but also to saponify an appreciable amount of the neutral fats, so that the yield in edible oils is substantially reduced. According to this invention, soda ash (anhydrous $Na_2CO_3$) is used, this being mixed with the oil and the mixture passed through the pinned disc mill. Only so much of soda ash is added as is theoretically necessary to combine with the fatty acids present, or but a very slight excess of soda ash. Experiments which I have made indicate that a very intimate mixture of the soda ash with the fatty acids in the mill results in the practically complete saponification of the fatty acids, while the neutral fats remain practically unsaponified.

As an example of the removal of free fatty acid from oils the following may be given: A certain whale oil contains 10.3% of fatty acid which it is desired to remove as far as possible. A solution is made containing 4.3 parts by weight of soda ash dissolved in 28 parts by weight of water, and this is run into the mill simultaneously with 224 parts by weight of the whale oil to be treated. The free fatty acid in the whale oil is saponified down to 0.5% on a single passage through the mill. Substantially none of the neutral fat in the whale oil will have been attacked by the soda ash in the treatment.

5. *Manufacture of lubricants and greases.*— Solid and semi-solid lubricants or greases such as Stauffer greases can be made in the mill as follows: Fatty matter is treated in the mill with a neutralizing agent so as to give a saponified product, and this product is afterwards mixed in the mill with a mineral oil, the mixture being subsequently boiled for a short time.

As an example of the process the following may be mentioned: An animal fat such as bone grease, or a vegetable fat such as palm oil, stearine or olein, or mixture of these, must be mixed with as nearly as possible the theoretical quantity of the neutralizing agent such as lime or caustic soda, which is required to neutralize or saponify the fatty acids. About 14% of lime may be needed for example. The fat if solid or semi-solid, may be melted, and the lime may be mixed with it in advance, or the melted fat may be fed to the high speed centrifugal pinned disc mill at the same time as the lime is fed thereto. Generally a single passage of the mixture through the mill suffices to produce the reaction, the saponified product being a solid in a finely divided or powdered form if it falls clear of the circumferential discharge of the mill for a sufficient distance to become cool before it touches the surface of a collecting chamber or channel. Otherwise the product will be semi-solid, and will need re-grinding preferably in a mill of the same type to reduce it to a finely powdered condition.

The finely divided product is mixed with mineral oil the amount of which will vary according to the quality of the grease required, and the mixture is passed through the high speed centrifugal pinned disc mill or is made therein by feeding the solid matter and mineral oil simultaneously into the mill. Suitable amounts of mineral oil may be such as to give from 16 to 24% of the lime soap in the finished grease. The mixed product discharged from the mill is delivered into pans and is kept boiling therein for say 15 to 30 minutes, or longer as may be required, when it can be run into receptacles ready for sale as a finished grease. The product is glossy and smooth, that is to say it is quite free from solid matter or grit, and a substantial saving is effected in the cost of manufacture owing to the short time which it occupies as compared with the processes hitherto usual wherein the constituents of the product are all boiled together for several hours.

I find that the neutralizing reaction in the mill is rendered more complete and instantaneous if a small percentage of water is present during the saponification. The lime may be moist when introduced for example, and in the case of a lime soap being first made as above described, about 2% of water in the product is sufficient. If the fatty acid is neutralized with caustic alkali, a larger percentage of moisture is desirable, say up to 5% or 7%, according to the required consistency of the final product. Instead of saponifying the fatty matter with the neutralizing agent first and then mixing in the mineral oil, it is possible to make a product by mixing all the ingredients together in one passage through the mill. For example 32 parts by weight of pale stearine may be mixed with 128 parts by weight of a mineral oil such as pale spindle oil, the mixture being heated to about 82° C. To this mixture may be added before the passage through the mill 4.5 parts by weight of solid sodium hydrate and 6 parts by weight of water, or the solid sodium hydrate and the water may be fed into the mill simultaneously with the oil. In order that the reaction may be complete it may be necessary to run the mixture two or even three times through the mill.

6. *Manufacture of disinfectants.*—A useful disinfectant preparation can be made by grinding rosin, preferably dry, in the mill, adding oil such as that commonly known as "brick oil" (which is a crude cresol distillate consisting of phenol and ortho, meta and para cresol,) and running the mixture through the mill, together with enough caustic soda or soda ash for saponification. The product is completed after a few times of passing through the mill.

As a practical example of this it may be stated that if 18 parts by weight of brick oil, 160 parts by weight of water, 0.5 parts by weight of ground rosin, and enough caustic soda to effect the saponification, are roughly mixed together and the mixture is then passed through the mill say three times, the product is a dense permanent emulsion of the disinfectant in water.

7. *Manufacture of size for use in papermaking and so forth.*—For making sizes, rosin is ground dry preferably in a pinned disc mill and is then mixed with a ready-made solution of caustic soda. The amount of soda required will vary according to the amount of free rosin which is to be left in the finished size. The mixture is run through the mill and the product in which some of the rosin is saponified by the caustic soda issues as a semi-solid. The amount of water introduced may be varied according to the stiffness of the product required.

8. *Manufacture of caustic soda.*—Methods hitherto employed for making caustic soda involve the agitation of soda ash ($Na_2CO_3$) with milk of lime for long periods, the concentration of the resulting solution being about 10%. According to the present invention a substantially better product of a higher concentration is obtained much more quickly. Milk of lime is prepared by stirring burnt lime with water, and soda ash is also made into a milk with water. These two milky preparations are mixed together and are passed through the high speed centrifugal pinned disc mill any required number of times. The product is then run into a filter press or is treated in a hydro-extractor, and the solution obtained consists of caustic soda of a strength of 20% or above, according to the length of treatment in the mill. The solution can, of course, be evaporated down to any required strength in evaporating pans, but much time and expense is saved in the evaporation owing to the relatively high initial concentration.

As a practical example the following may be given: 6 parts by weight of lime are slaked with 10 parts by weight of water to form the one ingredient, and 10.5 parts by weight of soda ash are dissolved in 25 parts by weight of water to form the other ingredient. These two ingredients are poured in simultaneously at a rate such that 16 parts by weight of the first are introduced in the mill while 35.5 parts by weight of the second are introduced at a uniform rate. The mixture as it issues from the mill should be passed through again, preferably twice at least, when the product will give a solution containing caustic soda of about 20% concentration.

9. *Accelerators for the vulcanization of India rubber.*—In order to make a product consisting of china clay, zinc oxide or the like impregnated with an ingredient to form a rubber accelerator, various processes are known in which liquid or gaseous ingredients combine to form a product for impregnating the china clay or zinc oxide. By introducing such ingredients into the mill together with the china clay or zinc oxide reactions between them can be caused to take place simultaneously with the grinding up of the china clay or zinc oxide into a finely divided form so that the finely divided product is uniformly impregnated with the ingredients introduced by reaction. The following will serve as examples: 1.5 parts by weight of piperidene, 1.5 parts by weight of carbon bisulphide, and 31 parts by weight of zinc oxide, are introduced into the mill either simultaneously, or in two lots consisting say of one-half of zinc oxide impregnated with piperidene and one-half impregnated with carbon bisulphide. The product is a useful rubber accelerator.

In another example, 6 parts by weight of china clay will replace the 31 parts by weight of zinc oxide in the first example.

It will be convenient here to mention also as an example of reactions between gases in the mill, the production of a rubber vulcanizing preparation consisting of china clay or zinc oxide impregnated with sulphur. It is well known of course that sulphur dioxide and hydrogen sulphide gases will react to produce sulphur. If china clay or the like is fed through the mill while simultaneously streams of sulphur dioxide and hydrogen sulphide are fed into the inlet of the mill through pipes, the gases will intimately mix in their passage through the mill to form sulphur, and this sulphur is intimately mixed with the disintegrated china clay or the like so that a substantially uniform product in a finely powdered form issues from the mill.

In all of the examples above set forth it is the intense beating action of the rotating and stationary pins in the mill combined with the forcing of the ingredients through the mill in a radial direction under the action of centrifugal force, which insures the thorough disintegration and intimate intermixing of the ingredients which renders their chemical reaction possible. It will be realized, therefore, that the invention depends upon the use of a high speed centrifugal pinned disc mill in which the ingredients are introduced at the centre and are intimately mixed in their passage radially through the mill between the pins.

Having thus described my invention what I claim as new and desire to secure by Letters Patent is:—

1. The process of forming products by chemical reactions which consists in mixing together the reacting substances and subjecting said substances to such high speed mechanical disintegration and violent centrifugal expulsive force that they form a permanent mixture and rapidly react directly with one another.

2. The process of forming products by chemical reactions which consists in mixing together the reacting substances, one at least of which is a fluid and subjecting the mixture to such a high speed mechanical disintegration and violent centrifugal expulsive force that the solid substances remain permanently in suspension in the fluid and react rapidly therewith.

3. The process of manufacturing soap which consists in adding alkali to a mixture of fatty acid and oil and subjecting the mixture to a mechanical disintegration at such a high speed and with such violent centrifugal expulsive force that simultaneously the alkali neutralizes the fatty acid and saponifies the oil.

4. The process of manufacturing soap which consists in the mixing together of oil and fatty acid in a melted condition, adding a solution of alkali, subjecting said mixture to a high speed mechanical disintegration and violent centrifugal expulsive force so that the oil becomes substantially saponified and the fatty acid neutralized while still in the liquid condition and subjecting the mixture to a second stage of such high speed mechanical disintegration.

JACOB WILLIAM SPENSLEY.